Patented Jan. 6, 1942

2,268,757

UNITED STATES PATENT OFFICE 2,268,757

CONTAINER

Jacob G. Mark, Cambridge, and Francis W. Lanigan, Belmont, Mass., assignors to Dewey and Almy Chemical Company, North Cambridge, Mass., a corporation of Massachusetts No Drawing. Application August 3, 1938,
Serial No. 222,862

7 Claims. (Cl. 99—181)

The present invention relates generally to containers and packages for foodstuffs and more particularly to a composition suitable for coating or impregnating the surfaces of such containers or packages which are to come in direct contact with the contents.

A lining or coating to be suitable for use in contact with foods and beverages should possess certain definite characteristics. It should be non-toxic and not impart any undesirable odor or taste to foodstuffs with which it comes in contact. It should be inert to the ingredients of the food and to any substances which may be formed during processing of the food if this processing is carried out after the food is placed in the container. Since such containers and packages are frequently subjected to rough usage during their useful life the lining or coating should have sufficient inherent flexibility to prevent its cracking or chipping upon flexure of the container structure under such usage. The coating should adhere to the material of the container, or to an under-coating if one is used, despite such rough usage, and throughout the range of temperature to which the container may be subjected in processing and in shipment and storage. The composition of the lining or coating should be so stable to decomposition or flow at elevated temperatures used in processing the containers, or their contents or encountered in storage or shipment, that no deleterious effects upon the contents will be produced.

The composition from which the coating or lining is to be formed should also have a high solids content at viscosities suitable for use with the spraying, flooding, dipping or roll coating apparatus by means of which it is applied.

It is a primary object of this invention to produce a coated or lined container or package possessing the advantages outlined above.

Another object of the invention is to provide a coating composition which may be readily coated on container material and which will adhere to the material throughout the operations of forming the material into containers and throughout the useful life of the container.

Another object of the invention is to produce a coating material for use on the inner surface of containers and packages which will not impart any undesirable odor, taste or toxicity to foodstuff inclosed in the container or package.

We have discovered that the objects of the invention may be obtained and that a coating meeting the foregoing qualifications may be formed from a composition including as its principal constituent a mixed lower aliphatic acid ester of cellulose, if suitable modifying agents are incorporated with this cellulosic material. These cellulose mixed ester materials in the form of a dried or baked coating film, have certain very desirable properties such as toughness and inertness which make such coatings advantageous for use in containers or packages. Experience with the known coating compositions embodying these mixed cellulose esters has however disclosed a tendency to impart an undesirable taste or odor to foodstuffs packaged in contact with them. This is particularly apt to be the case with spiritous beverages such as beer and with acidic foodstuffs such as orange juice, gingerale, mineral water or fruit. After considerable research on these products it has been found that the addition of a small proportion of a resin of the acrylic type together with a suitable compatible plasticizer to certain of the cellulose acetate-propionate and cellulose acetate-butyrate resins will produce a coating composition eminently suitable for lining or coating containers for use with food products. These compositions, unlike the corresponding unmodified cellulose mixed esters, possess the unexpected property of substantially permanent freedom from odor and taste. The incorporation of the acrylic resin with these cellulosic materials not only forms an initially odor and taste free composition but also prevents the development of taste or odor during prolonged storage under unfavorable conditions such as at elevated temperatures.

The cellulosic base materials which have been found suitable in this relation are the cellulose acetate-propionates and the cellulose acetate-butyrates. These materials possess to a high degree physical properties desired in the completed film and lend themselves readily to incorporation with the necessary modifying agents by the use of a mutual solvent. Cellulose acetate-propionate having an acetyl content in the neighborhood of 15% and a propionyl content of about 31% and cellulose acetate-butyrate having an acetyl content of about 28.7% and a butyryl content of about 15–18% have been found to be particularly suitable. We shall refer to esters of this type as "mixed esters" to indicate that the cellulose material has been reacted with two or more different organic acids.

The acrylic resin added as a modifying agent may be a resin resulting from the polymerization of acrylic acid or methacrylic acid or of esters of these two acids with lower aliphatic alcohols. Other alkyl substituted acrylic acids than methacrylic acid, or other esters, are also suitable. Resins resulting from the copolymerization of any two or more of these compounds may be used and we have found that copolymers formed by subjecting a mixture of lower alcohol esters of acrylic acid and methacrylic acid to polymerizing conditions give very satisfactory results. We at present prefer to use this copolymer or polymerized methyl, ethyl, propyl or butyl methacrylate. For convenience we shall refer to all of these resins as "acrylic resins."

The plasticizing agent must be compatible with the cellulose ester and the acrylic resin and should impart the necessary flexibility and resistance to cracking or chipping, to the completed film without deleteriously affecting its waterproofness. There are very likely several plasticizers among the large number of known plasticizers that will give satisfactory results, consequently we do not wish to be limited to the use of any particular compound or mixture of compounds as a plasticizing ingredient. We have found that dibutoxy ethyl phthalate gives eminently satisfactory results in proportions adapted to the proportion of resin added to the cellulose ester. Dibutyl phthalate and butyl phthalyl butyl glycollate may also be used, but generally with less satisfactory results. As a general rule the proportion of plasticizer varies inversely with the proportion of resin in the composition, larger proportions of plasticizer being required in compositions containing lower proportions of resin. Compositions containing from 5-30% of plasticizer have been found to be satisfactory but compositions containing 7-20% of plasticizer are preferred.

To illustrate the invention more fully we shall give the following examples, it being understood that in so doing we are not restricting the invention to the specific proportions, compositions, temperatures, etc., given. The parts are by weight.

*Example I*

Ten parts of cellulose acetate-butyrate having an acetyl content of about 28.7% and a butyryl content of about 15-18%, 2.5 parts of a 20% solution of acrylic resin in ethylene dichloride and 1 part of dibutoxy ethyl phthalate are mixed with a solvent consisting of 90 parts ethylene dichloride, 38 parts butyl acetate, 40 parts ethyl lactate, and 10 parts ethyl acetate, and the mixture sprayed on the entire inside surface of unlacquered number 2 cans. The solvent is evaporated and the coating dried by heating in an oven at 300° F. for 15 minutes. The film remaining on the inside surface of the can remained flexible and adherent and was free from odor and taste after three months storage at 100° F.

*Example II*

A composition is made up as in Example I, substituting for the cellulose acetate-butyrate a cellulose acetate-propionate having an acetyl content of about 15% and a propionyl content of about 31%. This composition was applied to cans by the procedure of Example I and was found to give an equally satisfactory coating.

Compositions containing from about 3-40% of an acrylic resin, based on the cellulose ester, give satisfactory coatings. If the resin content is raised much above 40% the films show a smoky character suggesting an incompatibility between the ingredients at these proportions. Films containing more than 23% resin show a roughening and "orange peel" formation when boiled in water. Films containing less than 3% of the resin generally are too brittle for satisfactory application to containers or require an excessive amount of plasticizer. We prefer to use 4-10% of resin in forming lacquers for use with process products.

The composition of our invention finds particular utility as a lining or coating for the inside surface of cans of metal or fibrous materials used as containers for corrosive food products such as beer, gingerale or orange juice, and for carbonated or uncarbonated mineral waters. The coating may be applied directly to the tinplate but is preferably applied over an undercoating of a conventional can base coat lacquer. The application may be made to the sheet stock before it is formed into cans or may be made to the inside of the can body and closure by any appropriate coating procedure. This coating ordinarily covers the entire inside surface of the can, but the composition may be used to stripe the can side seam with or without a complete coating of the inside of the can.

It may be desirable in some applications to coat sheet stock from which can ends are to be made with the lacquer, and subject it to baking temperatures above 350° F. to produce a hard enamel-like coating, since it is not possible to subject an entire coated can to these temperatures because the solder of the can will not withstand this degree of heat. In these cases the can body may be coated with the lacquer of this invention or other lacquers or enamels which have not been subjected to baking treatment at these high temperatures.

Our composition is also useful for coating the inner surface of closures of all types for food and pharmaceutical bottles and jars. With closures of the "Crown" type in which a "spot" of thin sheet metal covers the neck opening of the bottle the coating is preferably applied to the strip stock before the spots are formed from it.

Because of its flexibility, adherence, and freedom from odor or taste the composition of this invention will form an eminently satisfactory coating for paper or similar sheet materials which is to be used in forming containers or wrappings for food products which easily acquire a foreign taste or odor from their surroundings or which tend to easily lose their own flavor or aroma such as dairy products, coffee, cocoa, potato chips, meats, and nuts.

Films of our composition have a high resistance to flow and decomposition at elevated temperatures and are consequently useful as a coating or impregnating material for dishes or pans of fibrous material for use in baking.

The proportion of solvents to be added is dependent upon the manner in which the coating is to be applied, that is whether the composition is to be sprayed, flooded, dipped or roll coated and upon whether or not a base coating has been applied to the metal. If a base coating of a conventional can lacquer has been applied to the metal a thinner coating of the modified cellulosic composition can be used. Generally, thin coatings are preferred to heavier coatings.

We claim:

1. A food package comprising a food product and a sheet metal container having at least the surface thereof which is in contact with the food product composed of an odor and taste free composition which contains a mixed lower aliphatic acid ester of cellulose and an acrylic resin.

2. A food package comprising a food product and a sheet metal container having at least the surface thereof which is in contact with the food product composed of an odor and taste free composition which contains a cellulose acetate-butyrate and an acrylic resin.

3. A food package comprising a food product and a sheet metal container having at least the surface thereof which is in contact with the food product composed of an odor and taste free composition which contains a cellulose acetate-propionate and an acrylic resin.

4. A food package comprising a food product and a container having at least the surface thereof which is in contact with the food product composed of an odor and taste free composition which contains an acrylic resin and a mixed ester of cellulose selected from the class consisting of cellulose acetate-propionate and cellulose acetate-butyrate.

5. A food package comprising a container structure having at least the inner surface thereof which is to come in contact with the foodstuff composed of an odor and taste free composition which contains a mixed lower aliphatic acid ester of cellulose and an acrylic resin.

6. A food package comprising a food product and a glass container closed by a metallic closure member having at least the surface thereof which is in contact with the food product composed of a composition which contains a mixed lower aliphatic acid ester of cellulose and an acrylic resin.

7. A closure for foodstuff containers comprising a closure member and a lining covering all of that part of the closure member which is to come in contact with the foodstuff and consisting of an odor and taste free film containing an acrylic resin and a mixed lower aliphatic acid ester of cellulose.

JACOB G. MARK.
     FRANCIS W. LANIGAN.